(12) United States Patent
Sbida (10) Patent No.: US 7,554,991 B2
(45) Date of Patent: Jun. 30, 2009

(54) METHOD, SYSTEM AND NETWORK ELEMENT FOR DATA TRANSMISSION USING A TRANSITION MECHANISM

(75) Inventor: Ivan Laloux Sbida, Algeciras (ES)

(73) Assignee: Nokia Corporation, Espoo (FI)

( * ) Notice: Subject to any disclaimer, the term of this patent is extended or adjusted under 35 U.S.C. 154(b) by 891 days.

(21) Appl. No.: 10/677,751

(22) Filed: Oct. 3, 2003

(65) Prior Publication Data

US 2004/0264474 A1 Dec. 30, 2004

(30) Foreign Application Priority Data

Jun. 27, 2003 (EP) .................................. 03014728

(51) Int. Cl.
*H04L 12/56* (2006.01)
(52) U.S. Cl. .................................... 370/395.5; 370/401
(58) Field of Classification Search .............. 370/395.5, 370/338, 360, 395.54, 401, 389, 398, 230
See application file for complete search history.

(56) References Cited

U.S. PATENT DOCUMENTS

2004/0013130 A1* 1/2004 Blanchet et al. ............. 370/466
2004/0240468 A1* 12/2004 Chin et al. ................... 370/466
2004/0264465 A1* 12/2004 Dunk ........................... 370/392

OTHER PUBLICATIONS

B. Carpenter et al., "Transmission of Ipv6 over Ipv4 Domains without Explicit Tunnels," The Internet Society, Mar. 1999, pp. 1-9.

B. Carpenter et al., "Connection of Ipv6 Domains via Ipv4 Clouds," The Internet Society, Feb. 2001, pp. 1-21.

3rd Generation Partnership Project; Technical Specification Group Services and System Aspects; General Packet Radio Service; Service Description; Stage 2; Global System for Mobile Communications; 3GPP TS 23.060 V3.14.0 Dec. 2002, pp. 1-193.

F. Templin et al., "Intra-Site Automatic Tunnel Addressign Protocol (ISATAP)," The Internet Society, Mar. 21, 2003, pp. 1-16.

"Guidelines for 64-Bit Global Identifier (EUI-64™) Registration Authority," IEEE, http://standards.ieee.org/regauth/oui/tutorials/EUI64,html, Apr. 21, 2003, pp. 1-6.

C. Huitema, "Teredo: Tunneling Ipv6 over UDP Through NATS," The Internet Society, Jun. 6, 2003, pp. 1-53.

* cited by examiner

*Primary Examiner*—Seema S Rao
*Assistant Examiner*—Mon Cheri S Davenport
(74) *Attorney, Agent, or Firm*—Squire, Sanders & Dempsey L.L.P.

(57) ABSTRACT

A data transmission from a first node, such as a user equipment, to a second node, such as an application server or IMS, via a communication network using different types of communication protocols, such as a 3GPP communication network using IPv6 and IPv4, may be controlled by means of a transition mechanism, such as ISATAP. The transition mechanism may be located in the communication network, for example, in a gateway node like a GGSN, which typically acts as a transition mechanism proxy. A data transmission from the first node is commonly forwarded by the network node to the second node wherein the transition mechanism functionality is performed in the network node transparently for the first node.

27 Claims, 5 Drawing Sheets

METHOD, SYSTEM AND NETWORK ELEMENT FOR DATA TRANSMISSION USING A TRANSITION MECHANISM

BACKGROUND OF THE INVENTION

1. Field of the Invention

The present specification relates generally to a method and/or a system and/or a network node commonly usable for controlling a data transmission in a communication network. The present specification is also generally related to a data transmission control in a communication network which typically uses different types of transmission mechanisms and/or protocols, such as, for example, IPv4 and IPv6, particularly in a coexistence phase during a transition from one transmission mechanism to another, usually new, transmission mechanism in the communication network.

2. Description of the Related Art

In the last few years, an increasing extension of data and communication networks, in other words, of wire based networks, such as, but not limited to, the Integrated Services Digital Network (ISDN), and/or wireless networks, such as, but not limited to, the CDMA2000 (code division multiple access) system, Universal Mobile Telecommunications System (UMTS), the General Packet Radio System (GPRS), and/or other wireless communication systems, such as, but not limited to, the Wireless Local Area Network (WLAN), took place all over the world. Various organizations, such as the $3^{rd}$ Generation Partnership Project (3GPP), the International Telecommunication Union (ITU), $3^{rd}$ Generation Partnership Project 2 (3GPP2), Internet Engineering Task Force (IETF), and the like are working on standardization for such networks.

In general, the system structure of a communication network is such that a user equipment, such as a mobile station, a mobile phone, a fixed phone, a personal computer (PC), a laptop, a personal digital assistant (PDA) or the like, is connected, commonly via transceivers and interfaces such as an air interface, a wired interface or the like, to an access network subsystem. The access network subsystem normally controls the communication connection to and/or from the user equipment and is usually connected via an interface to a corresponding core and/or backbone network subsystem. The core, or backbone, network subsystem typically switches the data transmitted via the communication connection to a destination, such as another user equipment, a service provider (server/proxy), and/or another communication network. The core network subsystem may be connected to a plurality of access network subsystems. The respective network structure may vary, as known to those skilled in the art, and may be defined in respective specifications, for example, for UMTS, GSM and the like.

Generally, for properly establishing and/or handling a communication connection between network elements such as, for example, the user equipment and another user terminal a database a server, etc. one or more intermediate network elements, such as, but not limited to, support nodes and/or service nodes are generally involved. Data, such as voice, multimedia, control signaling data and the like, are transmitted, for example, by means of a packet based data transmission. One example for a utilized packet based data transmission protocol is the Internet Protocol (IP). For this protocol type, there are currently available several versions, for example, IPv4, and the like, which are commonly known. However, due to changing requirements and/or load conditions in the networks, more sophisticated versions have been developed, such as IPv6.

For example, with regard to the above mentioned IPv4 and IPv6, the IPv4 address space is typically being rapidly exhausted as new nodes and/or networks are added to the Internet routing structure. One great benefit of IPv6 is that it generally provides a considerably larger address space. Although addressing capabilities of IPv4 have, in many instances, been successfully extended by introducing, for example, private addressing, temporary global addresses and/or address translators, it may become the case that, with the current growth rate of the Internet, at least in terms of number of hosts connected to it and in terms of adoption of new services, the number of unique globally routable addresses being available in the IPv4 addressing domain may not remain sufficient for the future needs. Thus, one main motivation for IPv6 deployment results from the general preference for global reachability of Internet hosts. Furthermore, IPv6 also commonly offers an enhanced security level and/or mobility support.

Of course, when network operators change the existing IPv4 network environment to IPv6, there will typically be a transition period when IPv4 hosts coexist with IPv6 hosts. Taking this into consideration, there have been developed several transition mechanisms which generally aim to maintain interoperability during this transition period between IPv4 and IPv6 parts. These mechanisms may generally be classified into three main groups: Dual Stack, Tunneling and Protocol Translation. A Dual Stack node commonly implements both IPv4 and IPv6 protocol stacks, normally allowing connection to both IPv4 and IPv6 networks. Tunneling is usually a forwarding technique in which a packet is typically encapsulated into another type of packet, for example, IPv6 datagrams may be encapsulated within IPv4 packets and may be decapsulated at a corresponding receiving node. Thus, this technique generally provides a way to utilize an existing IPv4 routing infrastructure to carry IPv6 traffic, or vice versa. Tunneling commonly requires dual stack functionality in both encapsulating and decapsulating nodes. Finally, Protocol Translators are normally required when two communicating nodes are not sharing the same version of IP.

In "Intra-Site Automatic Tunnel Addressing Protocol (ISATAP)" by F. Templin et al., there is defined one example of a specific type of such a transition mechanism for providing IPv6 connectivity within an IPv4 network. Another example for a transition mechanism is disclosed, for example, in RFC (Request for Comments) 3056, "Connection of IPv6 Domains via IPv4 Clouds" by B. Carpenter et al.

Figure 5:
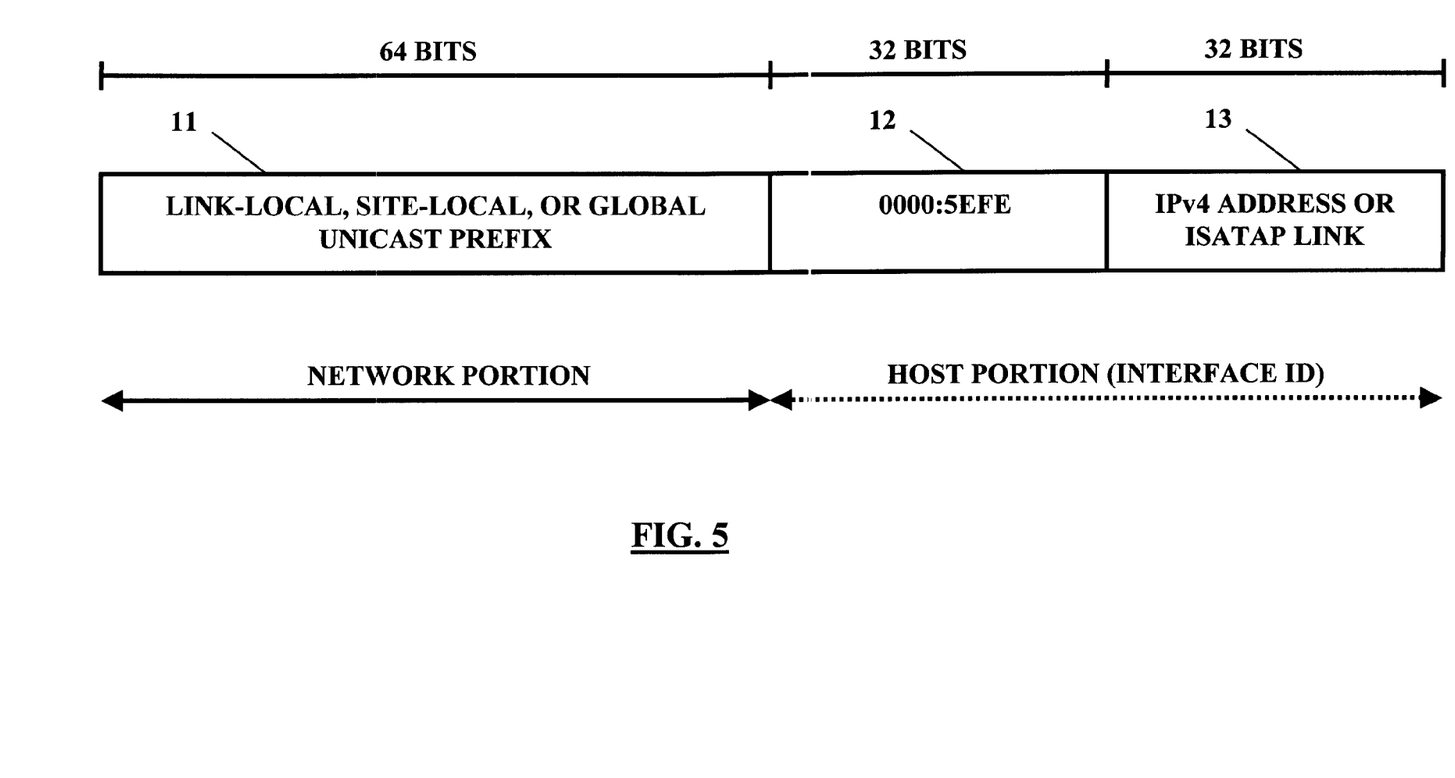
FIG. 5 shows an illustration of an exemplary ISATAP address format.

As shown in FIG. 5, in the case of ISATAP, ISATAP nodes typically have special IPv6 addresses, usually with a special ISATAP format interface identifier, which normally embeds an IPv4 address. The ISATAP address format generally includes two portions, for example, a network portion (IPv6 prefix) and a host portion. ISATAP nodes are commonly assigned a normal IPv6 prefix 11, for example, of 64-bit size, which may be, for example, link-local, site-local or global scope, and the specific ISATAP format interface identifier 12, 13 of, for example, 32+32 bit=64-bit size. The interface identifier is commonly constructed by using a "modified EUI-64" format according to the IEEE EUI-64 standard, usually by appending an IPv4 address 13, which is normally assigned to the node, to a 32-bit string '00-00-5E-FE' 12 which typically includes an organizationally-unique identifier (OUI) and/or a respective type field. For the IPv4 address, either public or private IPv4 addresses may be used.

Figure 6:
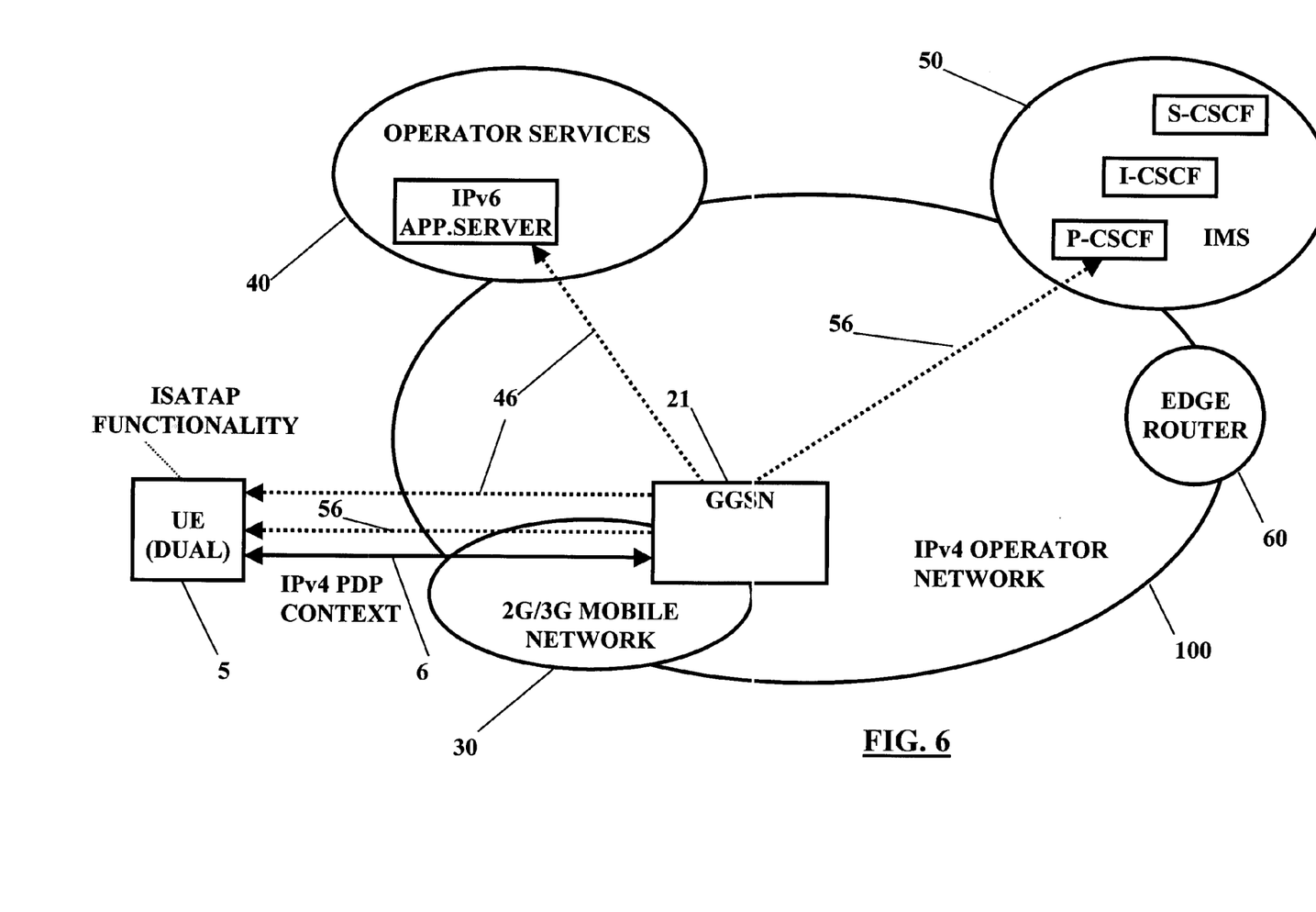
FIG. 6 shows an example of an implementation of a transition mechanism in a communication network.

In FIG. 6, an example of an implementation of a transition mechanism, such as ISATAP, in a communication network, for example, a 3GPP based communication network, is shown.

According to FIG. 6, reference character 5 denotes a user equipment (UE) which is commonly a dual stack device implementing both IPv4 and IPv6 stacks. Reference character 21 denotes a Gateway GPRS Support Node (GGSN) representing a control network element of, for example, a 2G/3G mobile network 30. As commonly known, the 2G/3G mobile network typically further includes access network subsystem elements and/or core network subsystem elements, not shown, for establishing and/or controlling a communication connection of the UE 5. Reference character 100 denotes an IPv4 based operator network. Reference character 40 denotes an operator services portion of the operator network which typically includes one or more IPv6 based application servers, although, to enhance clarity, only one thereof is shown, providing IPv6 based services. Reference character 50 denotes an IP Multimedia Subsystem generally including, for example, a Proxy Call State Control Function (P-CSCF), an Interrogating Call State Control Function (I-CSCF), and/or a Serving Call State Control Function (S-CSCF). Reference character 60 denotes an edge and/or border router. The above mentioned elements are known to a person skilled in the art so that a detailed description thereof may be omitted.

According to ISATAP, the site's IPv4 infrastructure 100 is normally treated as a link layer for IPv6 communications, usually using automatic IPv6-in-IPv4 tunneling. This typically enables an incremental deployment of IPv6 infrastructure within the IPv4 sites with no scaling issues at border gateways. Moreover, no special IPv4 services within the site, for example, multicast, are normally required. In addition, ISATAP generally supports both manual address configuration and stateless address autoconfiguration, and it is usually compatible with other transition mechanisms, for example, the 6 to 4 tunneling according to RFC 3056.

As also shown in FIG. 6, ISATAP nodes are commonly dual stack terminals 5 which are often capable of automatically tunneling data packets to the IPv6 next-hop address through the IPv4 infrastructure. This means that, at least for the application of the ISATAP mechanism in a 3GPP network, the ISATAP functionality, in other words, packet encapsulation/decapsulation, etc., typically resides in the UE 5. Thus, in the example shown in FIG. 6, the IPv6-in-IPv4 tunneling is generally performed in the UE 5. Packets are commonly sent via the 2G/3G mobile network's GGSN 21 by means of, for example, IPv4 PDP context connection 6, and the corresponding ISATAP links 46 and 56 normally extend from the UE 5 to the respective IPv6 service located in portions 40 and/or 50.

However, the usage of a transition mechanism, such as ISATAP, may increase the complexity of the communication system and, for example, the costs of a corresponding user equipment. When deploying, for example, ISATAP in a 3GPP cellular operator network, the UEs preferably implements all the ISATAP node functionality in order to allow tunneling of IPv6 packets over the IPv4 network. In other words, encapsulation/decapsulation is typically performed in the UE. This generally involves a huge increase in the complexity and/or costs of the UEs, and different vendors commonly have to implement ISATAP in their terminals in order to enable IPv6 connections within an IPv4 operator network. Therefore, the deployment of transition mechanism, and thus also of more sophisticated communication protocols, or the like, in an existing network structure, may become complicated. Further, there is the possibility that the migration to the more sophisticated communication technique, for example, the migration from IPv4 to IPv6, may be decelerated, especially since a demand of IPv6 services by the vast majority of users is typically reduced because, presumably, only high-end, and expensive, terminals are usually capable of accessing IPv6 services.

SUMMARY OF THE INVENTION

Thus, it is generally desirable to provide an improved mechanism for controlling data transmission, usually in connection with a transition mechanism which allows the above limitations to be overcome.

This may, for example, be achieved by the measures recited in the appended claims.

According to certain embodiments of the present invention, there is provided, for example, a method of controlling a data transmission, generally from a first node to a second node, via a communication network wherein the first node is typically connected to the communication network by means of, for example, a communication protocol of a first type and wherein the communication network commonly uses, at least in part, a communication protocol of a second type for forwarding the data transmission from the first node to the second node. The method generally includes the steps of activating a communication connection, typically based on the communication protocol of the first type from the first node to a network node of the communication network, allocating a first connection information part normally including an address related to the communication protocol of the first type to the communication connection of the first node, allocating, usually based on a transition mechanism used by the communication network, a second connection information part commonly including an address related to the communication protocol of the second type to the communication connection of the first node, and storing, typically by the network node, the first connection information part and/or the second connection information part in a register, wherein the second connection information part is normally associated with the first connection information part in a common entry in the register.

Furthermore, according to certain embodiments of the present invention, there is provided, for example, a system for controlling a data transmission from a first node to a second node, usually via a communication network. The first node is generally connected to the communication network by means of a communication protocol of a first type and the communication network typically uses, at least in part, a communication protocol of a second type for forwarding the data transmission from the first node to the second node. The system commonly includes means for activating a communication connection, often based on the communication protocol of the first type, usually between the first node and a network node of the communication network, means for allocating a first connection information part normally including an address related to, for example, the communication protocol of the first type to the communication connection of the first node, means for allocating, generally on the basis of a transition mechanism that may be used by the communication network, a second connection information part commonly including an address related to the communication protocol of the second type to the communication connection of the first node, and/or means for associating the second connection information part with the first connection information part and/or for storing the associated first and second connection information parts, typically in a register.

Moreover, according to certain embodiments, there may be provided, for example, a network node of a communication network, the network node commonly being usable for controlling a data transmission from a first node to a second node, usually via the communication network, wherein the first node is normally connected to the network node by means of, for example, a communication protocol of a first type and wherein the communication network generally uses, at least in part, a communication protocol of a second type, usually for forwarding the data transmission from the first node to the second node. The network node typically includes means for activating a communication connection, usually based on the communication protocol of the first type between the first node and the network node, means for allocating a first connection information part commonly including an address related to the communication protocol of the first type to the communication connection of the first node, means for allocating, generally on the basis of a transition mechanism used by the communication network, a second connection information part often including an address related to the communication protocol of the second type to the communication connection of the first node, and/or means for associating the second connection information part with the first connection information part and/or for storing the associated first and second connection information parts, commonly in a register.

Certain other embodiments may include one or more of the following features:

- for the activation of the communication connection, an activation request may be sent from the first node to the network node, the activation request typically including at least one of an indication for a dynamic addressing and an indication of an address type for the communication protocol of the first type;
- for allocating the first connection information part commonly including an address related to the communication protocol of the first type to the communication connection of the first node, the address related to the communication protocol of the first type may be allocated by the network element;
- for allocating the first connection information part generally including an address related to the communication protocol of the first type to the communication connection of the first node, the address related to the communication protocol of the first type may be requested from an external address allocation element, normally contacted by the network element;
- for allocating the second connection information part usually including an address related to the communication protocol of the second type to the communication connection of the first node, the address related to the communication protocol of the second type may be allocated by the network element, typically from an internal pool of addresses;
- for allocating the second connection information part commonly including an address related to the communication protocol of the second type to the communication connection of the first node, the address related to the communication protocol of the second type may be requested from an external address allocation element, generally contacted by the network element;
- the network element may store the first connection information part and/or the second connection information part associated with each other by, for example, an entry in a table portion that is typically related to the communication connection of first node, wherein the second connection information part may be stored in a specific table field of the table portion;
- the data transmission based on the communication protocol of the first type may be tunneled between the first node and the second node, commonly via the network node, generally by means of a connection based on the communication protocol of the second type;
- the data transmission may be a packet based data transmission, the communication protocol of the first type may be one type of an Internet protocol, according to certain embodiments, an IPv6 based protocol, and the communication protocol of the second type may be another type of an Internet protocol, according to certain embodiments, an IPv4 based protocol;
- the communication connection between the first node and the network node may be based on a packet based data transmission protocol context, for example, on a Packet Data Protocol context;
- the transition mechanism used by the communication network may be an automatic tunneling mechanism which typically uses, for example, the Intra-Site Automatic Tunnel Addressing Protocol;
- the network node may be a gateway node of the communication network such as, for example, a Gateway GPRS Support Node.

By virtue of certain embodiments of the present invention, the following advantages may be achieved:

It is generally possible for the complete functionality of the transition mechanism to be centralized in, for example, a network node of the communication network and commonly does not need to be performed in the user equipment. For example, the ISATAP functionality may be performed by a GGSN instead of the UE and/or IPv6 tunneling over an IPv4 operator network may be achieved by performing encapsulation/decapsulation of packets in the operator network. Hence, by providing a transition mechanism proxy in the communication network, for example, an ISATAP proxy for the 3GPP network, it is generally possible that the GGSN implements all, or at least a major portion, of the ISATAP functionality on behalf of the UE, thus typically avoiding an unnecessary increase in the terminal's (UE's) complexity and/or costs.

Certain embodiments of the present invention may be easily implemented by means of, for example, modifications in existing network node structures, such as, but not limited to, the GGSN. On the other hand, no additional configuration is normally needed in the terminals, such as, but not limited to, the UE. According to certain embodiments, the proposed solution may be implemented by means of software modifications.

The transition mechanism, for example, ISATAP, functionality employed by the network node is often transparent to the UE which generally allows the usage of terminals not specifically prepared for the transition mechanism. In particular, it is not commonly required that the UE be a dual stack UE. In other words, it is typically sufficient when the UE supports, for example, the access to IPv6 services, such as IP Multimedia Subsystem (IMS) or the like. However, certain embodiments of the present invention are also generally applicable in connection with such dual stack terminals. Thus, almost any terminal is normally able to make use of IPv6 services, which usually results in increasing the demand of new end-to-end services and/or paving the way for, for example, IPv6 migration.

The above and still further objects, features and advantages of certain embodiments of the present invention will become more apparent upon referring to the description and the accompanying drawings.

BRIEF DESCRIPTION OF THE DRAWINGS

For an enhanced understanding of certain embodiments of the present invention, reference may be made to the accompanying drawings, wherein.

DETAILED DESCRIPTION OF THE PREFERRED EMBODIMENT(S)

According to certain embodiments of the present invention, a data transmission from a first node, such as, but not limited to, a subscriber's terminal node or user equipment UE, to a second node, such as, but not limited to, an application server or a multimedia subsystem like, for example, IMS, via a communication network, such as, but not limited to, a 3GPP communication network, is typically controlled by means of a transition mechanism. In other words, the communication network generally implements a communication protocol of a first type, such as IPv6, and, at least in part, a communication protocol of a second type, such as IPv4, in the operator network. The transition mechanism is commonly located in the communication network, for example, in a gateway node like a GGSN. Hence, according to certain embodiments, the network node normally acts as a transition mechanism proxy for the data transmission. Thus, a data transmission from the first node is typically forwarded, and/or tunneled, by the network node to the second node, wherein the transition mechanism functionality is generally performed in the network node transparently for the first node.

According to certain embodiments, the term communication network is commonly not only a type of one single network but also typically a network type which may be split into other network types, such as an operator's network, a radio access network, etc.

The user equipment (UE) may be a terminal apparatus of a different type. For example, the UE may be a mobile or fixed phone, a personal computer, a server, a mobile laptop computer, a personal digital assistant (PDA) or the like. Irrespective of its specific type, the UE may include several means which are highly preferable for its communication functionality. Such means may include, for example, a processor unit for executing instructions and/or processing data for the communication connection, for example, transmission content and/or signaling related data, memory means for storing instructions and/or data, commonly utilized for serving as a work area of the processor and the like, for example, ROM, RAM, EEPROM, and the like, input means, generally for inputting data and/or instructions by software, for example, a floppy diskette, CD-ROM, EEPROM, data interface means, and the like, user interface means, typically for providing monitor and/or manipulation possibilities to a user, for example, a screen, a keyboard, a microphone and headset for communication, and the like, and network interface means, commonly for establishing a communication connection under the control of the processor unit, for example wired or wireless interface means, an antenna, and the like. These means may be integrated within one device, for example, in a mobile or fixed telephone or in several devices forming the user equipment, for example, in a laptop.

The network node generally used as the transition mechanism proxy, such as the GGSN, may be implemented by software and/or by hardware. In any case, for executing its respective functions, correspondingly used devices and/or network elements usually include several means which are highly preferable for control and/or communication functionality. Such means typically include, for example, a processor unit for executing instructions and/or processing data, for example, transmission content and signaling related data, memory means for storing instructions and data, and commonly for serving as a work area of the processor and the like, for example, ROM, RAM, EEPROM, and the like, input means for inputting data and/or instructions by software, for example, a floppy diskette, CD-ROM, EEPROM, and the like, user interface means for providing monitor and/or manipulation possibilities to a user, for example, a screen, a keyboard and the like, and interface means for establishing a communication connection, typically under the control of the processor unit, for example, wired and wireless interface means, an antenna, and the like.

In the following, a first embodiment is described with reference to FIGS. 1 to 3. This first embodiment is generally directed to a case where IPv4 and IPv6 are implemented in the communication network based on the 3GPP specifications, and the utilized transition mechanism is normally based on ISATAP.

Figure 1:
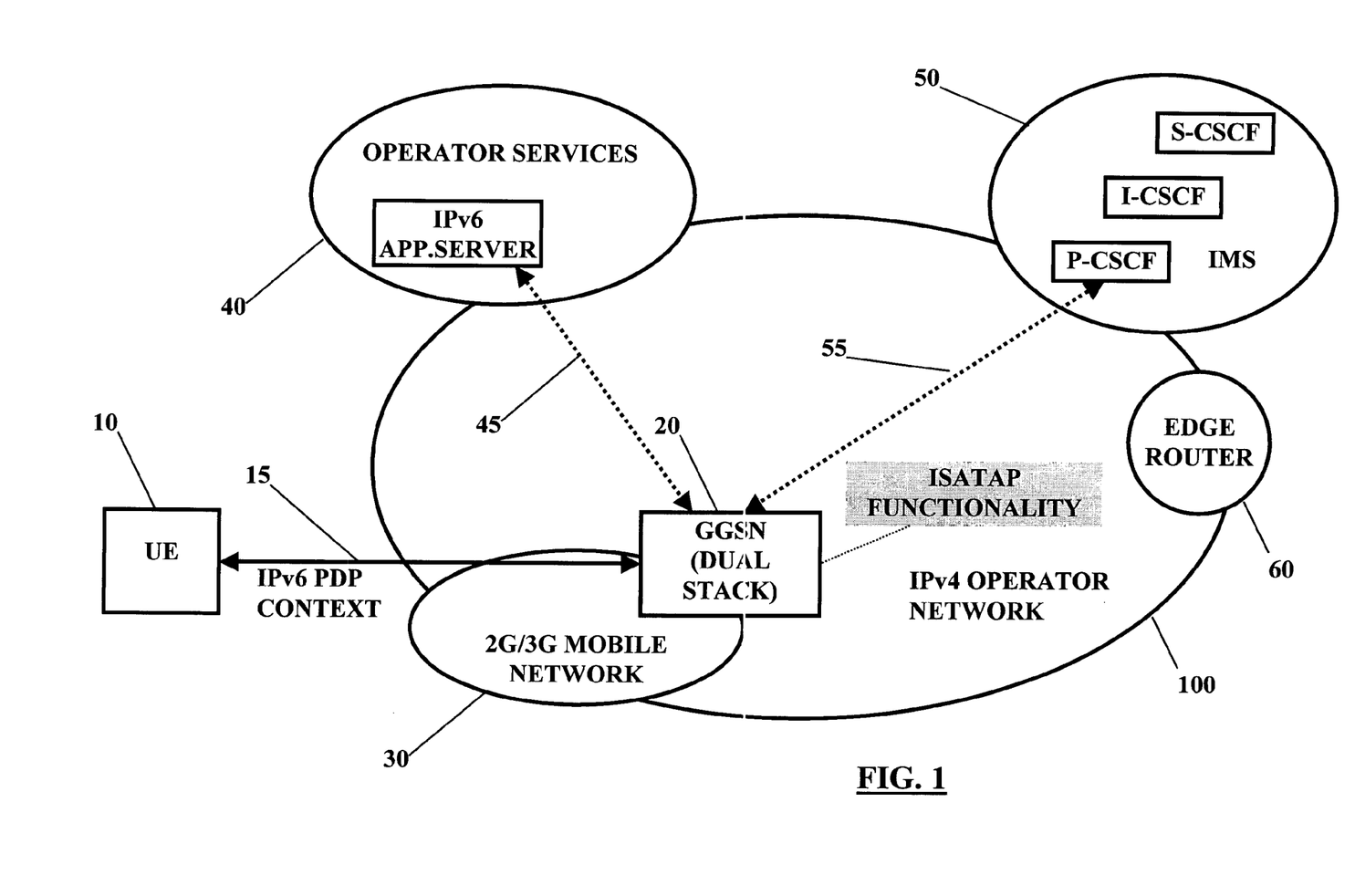
FIG. 1 shows an example of an implementation of a transition mechanism in a communication network according to certain embodiments of the present invention.

In FIG. 1, reference sign 10 denotes a representative user equipment (UE). The UE 10 may be an IPv6 capable terminal device or may be a dual stack device, implementing both IPv4 and IPv6 stacks. Reference character 20 denotes a Gateway GPRS Support Node (GGSN), commonly representing a control network element of a 2G/3G mobile network 30. The GGSN 20 is typically a dual stack GGSN, implementing both IPv4 and IPv6 stacks. The 2G/3G mobile network further usually includes access network subsystem elements (not shown), such as base stations and the like, and/or core network subsystem elements, such as a Serving GPRS Support Node (SGSN), for establishing and/or controlling a communication connection to and/or from the UE 10. Reference character 100 denotes a IPv4 based operator network. Reference character 40 denotes an operator services portion of the operator network 100 which generally includes one or more IPv6 based application servers, though only one is shown in the figure, providing IPv6 based services. Reference character 50 denotes an IP Multimedia Subsystem (IMS) commonly including a Proxy Call State Control Function (P-CSCF), an Interrogating Call State Control Function (I-CSCF), and/or a Serving Call State Control Function (S-CSCF). The IPv6 application server and the IMS represent two of several possibilities for nodes providing IPv6 services which the UE 10 may access via the IPv4 operator network. Reference character 60 denotes an edge or border router which is not essential for the proposed mechanism but that is introduced so as to illustrate that the operator network 100 may be connectable to other networks/resources through corresponding edge and/or border routers.

In the GGSN 20, the ISATAP functionality, for example, encapsulation/decapsulation, and the like is implemented. However, the ISATAP functionality typically is completely transparent to the UE 10. The UE 10 is generally connected to the network, in other words, to the GGSN 20, by using an IPv6 packet based data transmission protocol context, in other words, in the present example, by an IPv6 PDP context based communication connection 15. Data packets are commonly transmitted via this connection 15 and an IPv6-in-IPv4 tunneling procedure is normally performed in the GGSN 10. Thus, corresponding ISATAP links 45, 55 typically extend between the IPv6 application services, for example, operator services 40 or IMS 50, and the GGSN 20.

In the embodiment according to FIG. 1, for example, an IPv6/dual stack UE 10 generally attempts to access an internal IPv6 service provided by the network operator, for example, IMS 50, while the operator network 100 is commonly still IPv4 based. In other words, the migration to IPv6 is not finalized.

Figure 3:
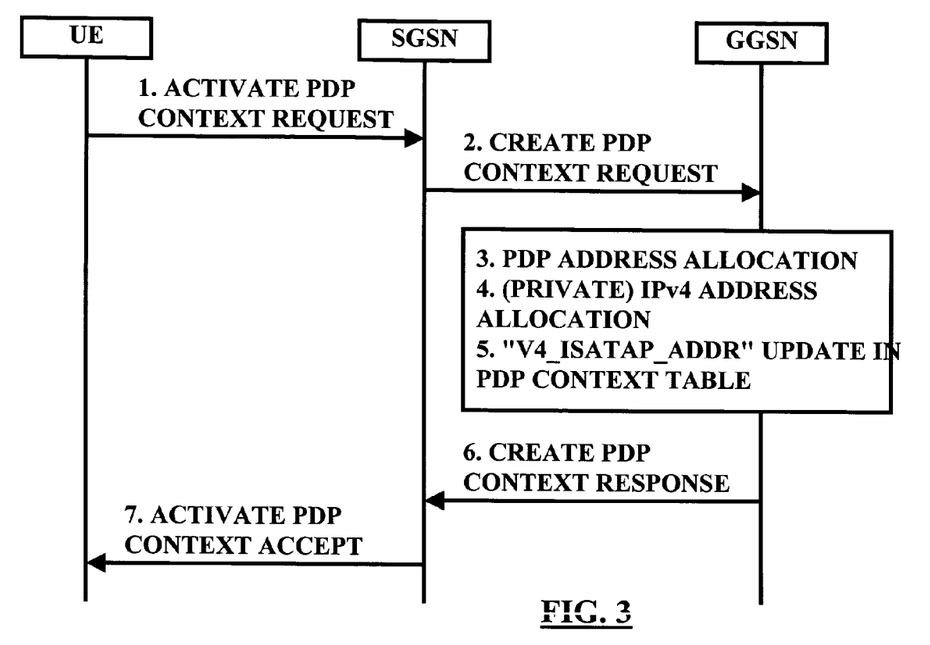
FIG. 3 shows an example of a communication connection activation procedure according to certain embodiments of the present invention.

In FIG. 3, a PDP context activation procedure is illustrated which is usually performed by the UE 10, typically in order to establish a communication connection via the mobile network 30 to the desired service, for example, IMS 50. The PDP context activation procedure generally utilized in the present embodiment is often based on a standard PDP Context Activation Procedure, usually defined in 3GPP specification TS 23.060, and only those steps of the procedure normally relevant to the present example are described in greater detail.

If no IPv6 PDP context has been previously activated, the UE 10 usually requests the activation of a new IPv6 PDP context (step 1) by sending a corresponding request to the network's SGSN, which is not shown in FIG. 1. A PDP address information element is commonly sent according to the standard procedure (3GPP TS 23.060) of activating a PDP context. When the UE 10 wants to establish an IP connection, it normally has to activate a PDP context, and such PDP context is typically directly related to the IP address assigned to the UE. Moreover, when following the standard procedure to activate a PDP context, the UE generally sends an "Activate PDP Context Request" message (3GPP TS 23.060) to the SGSN, and such a message commonly includes the PDP address information element described below.

According to certain embodiments, the Activate PDP Context Request message sent by the UE 10 specifies a dynamic IPv6 address in the PDP Address information element. Furthermore, an Access Point Name information element in the request message usually includes the desired access point name (APN) which normally corresponds to the desired internal IPv6 service, for example, IMS 50.

Figure 2:
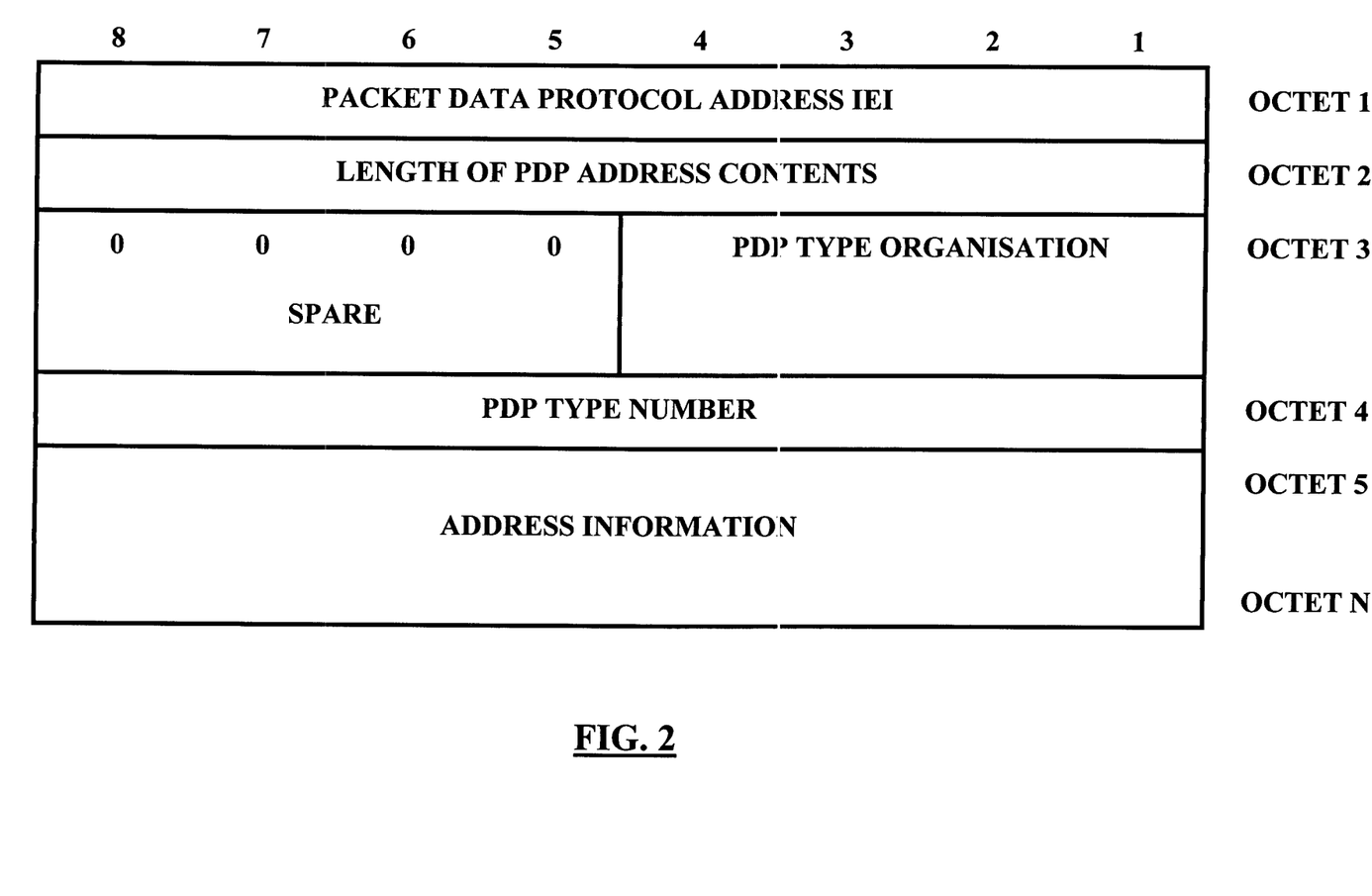
FIG. 2 shows an example of a packet based data transmission protocol address information element.

An example of the PDP Address information element according to certain embodiments is shown in FIG. 2. The PDP Address information element of the Activate PDP Context Request message typically includes a plurality of data octets, 1 to N, usually defining respective information portions of the PDP Address information element. These information portions normally include a packet data protocol address information element identifier (IEI), a portion defining a length of PDP address contents, a portion defining a PDP type organization, a portion defining a PDP type number, and/or a portion defining address information. Additionally, some portions may be spared by definition.

For the request of the UE 10 for the activation of a new (IPv6) PDP context in order to access an IPv6 internal service, the content of the PDP Address information element of the Activate PDP Context Request generally follows one or more of the rules defined below in order to force the allocation of a dynamic IPv6 address:

the value of octet 2 is 0000 0010, indicating dynamic IP addressing;

the value of octet 3, a PDP type organization field, is 0001, an IETF allocated address;

the value of octet 4 is 01010111, an IPv6 address; and the address information field remains empty.

After receiving and validating the Activate PDP Context Request message by the SGSN, a corresponding Create PDP Context Request message (step 2) is typically sent from the SGSN to the affected GGSN 20. The GGSN 20 may use the included APN to find an external service and/or to activate a service for the APN.

Furthermore, an IPv6 address, generally including an IPv6 prefix and an interface identifier, is commonly allocated for the UE 10 by the GGSN (steps 3 to 5). The GGSN 10 normally creates a new entry in a register typically including a corresponding PDP context table. The new entry generally allows the GGSN 10 to route PDP protocol data units (PDU) between the SGSN and an external PDP network.

Since the operator network 100 is commonly IPv4 based, a transition mechanism according to ISATAP is also normally executed by the GGSN 20. Therefore, an ISATAP address is typically highly favorable for the UE 10. After allocating the IPv6 prefix, an ISATAP format interface identifier, in other words, an IPv4 address, is preferably assigned to the UE 10. However, as the UE 10 may choose to use a different interface identifier without involving the network (as specified, for example, in 3GPP TS 23.060), an allocation of such an ISATAP format interface identifier directly to the UE is not generally preferable. Instead, the GGSN 20 typically keeps the relationship between the PDP context (IPv6) and its corresponding IPv4 address, commonly used for ISATAP, while the PDP context with the UE 10 is active. The GGSN 20 normally also allocates an IPv4 address, associates the IPv4 address with the allocated PDP address, and/or stores (updates) this association in the corresponding entry of the GGSN's PDP context table, generally by adding the information element, for example, in a 32-bit field, to the table containing the IPv4 address. The 32-bit field may be defined, for example, as a "V4_ISATAP_ADDR" field. In certain embodiments, the GGSN 20 typically includes a pool of, generally private, IPv4 addresses for the allocation. Due to the often huge number of terminals in a 3GPP network and/or the lack of public IPv4 addresses, it is commonly preferable to allocate private IPv4 addresses for ISATAP since public addresses are typically not necessary for the tunneling mechanism.

In other words, according to certain embodiments, the standard procedure is generally followed to allocate an interface identifier for the UE, but when the GGSN 20 creates a new entry in the PDP context table to store the assigned IPv6 prefix, it normally also allocates an IPv4 address (ISATAP interface identifier) and commonly stores this in the new entry of the PDP context table, usually under the "V4_ISATAP_ADDR" field. The allocation of the IPv4 address by the GGSN 20 is typically performed by using a pool of IPv4 addresses maintained in the GGSN 20.

Then, the GGSN 20 generally returns a Create PDP Context Response message (step 6) to the SGSN, often including the PDP address allocated by the GGSN 20. The SGSN commonly processes the information included in the response message, in other words, typically inserting PDP addresses received from the GGSN 20, selecting connection resources and the like, and generally sends an Activate PDP context Accept message to the UE 10 (step 7) for completing the establishment of the communication connection. The above described steps 6 and 7 may be equivalent to corresponding steps defined in 3GPP TS 23.060.

Next, other embodiments are described with reference to FIG. 4. Those network elements and processing steps of these embodiments normally being equivalent to those of the embodiments described above are not described in detail for simplification.

Figure 4:
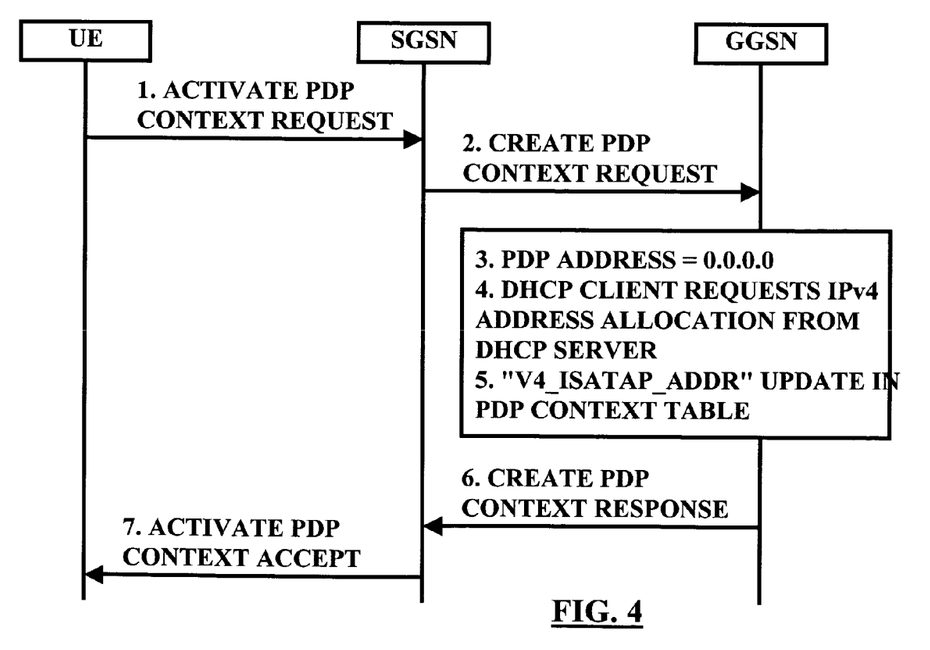
FIG. 4 shows an example of a communication connection activation procedure according to certain other embodiments of the present invention.

Some embodiments differ from other embodiments at least with respect to the allocation process of the IPv4 and IPv6 addresses in the GGSN 20 (steps 3 to 5 in FIG. 4). For example, according to certain embodiments, the GGSN 20 is typically configured, for example, by the network operator to use an external address allocation element for requesting a respective IP address. The usage of such an external address allocation element may be specified or decided based on the APN indicated in the Activate PDP context Request message (step 1). The external address allocation element may be implemented, for example, by means of a Dynamic Host Control Protocol (DHCP) client (not shown), commonly in the GGSN, and a corresponding DHCP server (not shown) generally contacted by the DHCP client.

As illustrated in FIG. 4, after the SGSN has sent the Create PDP context Request message (step 2) to the GGSN 20 and the address allocation is indicated to be externally controlled, for example, by evaluating the APN, the GGSN 20 usually initially sets the PDP address for the UE 10 to 0.0.0.0, and this address is typically returned to the UE 10 via the SGSN. This specific PDP address normally indicates that the PDP address may be negotiated by the UE, usually with the external packet data network after completion of the PDP Context Activation procedure. The GGSN is commonly adapted to relay, modify and/or monitor these negotiations, usually for as long as the PDP context is in an ACTIVE state.

Furthermore, at least with regard to the allocation of the IPv4 address for the ISATAP link, the GGSN 20 generally also uses an external address allocation element. Hence, the GGSN 20 typically implements the DHCP client and commonly requests the IPv4 address from a DHCP server (not shown). In addition, the GGSN 20 often keeps the relationship between the PDP context (IPv6) and the corresponding IPv4 address (used for ISATAP) while the PDP context with the UE 10 is active. The GGSN 20 usually requests an IPv4 address from the external address allocation element, associates the received IPv4 address with the allocated PDP address, and/or stores (updates) this association in the corresponding entry of the GGSN's PDP context table, generally by adding the information element, for example, in the 32-bit field "V4_ISATAP_ADDR", to the table containing the IPv4 address.

Thus, according to certain embodiments of the present invention, it is often possible to implement a transition mechanism such as, but not limited to, ISATAP in communication networks, for example, 3GPP based, in a manner which typically requires no specific changes in the user terminal nodes. This means, that IPv6-in-IPv4 tunneling is normally completely transparent to the (user) terminal nodes. This may be achieved, for example, by defining an ISATAP proxy in the GGSN, which commonly performs all of the ISATAP node functionality on behalf of the corresponding UE. The proposed embodiments may be implemented as a software upgrade in the GGSN wherein a new field, for example, "V4_ISATAP_ADDR", is generally added to the PDP context table, and the GGSN is usually capable of allocating and/or requesting, either from a pool of private IPv4 addresses or by using a DHCP client/server architecture, and/or storing a corresponding IPv4 address associated with an allocated IPv6 address. The so-called 6in4 tunneling is typically performed by the GGSN using the IPv4 address stored in the corresponding entry of the PDP context table.

According to certain embodiments, the allocation of IPv6 addresses and IPv4 addresses is commonly performed directly by the GGSN 20 while, according to other embodiments, the allocation of IPv6 addresses and IPv4 addresses is normally performed by using an external address allocation element such as a DHCP client/server architecture. However, it is also possible to combine these features such that one type of addresses is generally allocated by the GGSN while the other type of addresses is typically allocated by the external address allocation element.

Moreover, even though certain embodiments of the present invention are described as being related to the ISATAP based transition mechanism and the 3GPP based mobile communication network, it is to be understood that the embodiments of the present invention are not limited to this scenario. For example, certain embodiments may also be applied for other communication network types, for example, 3GPP2 based or fixed communication networks. Also, the utilized transition mechanism may be of a different type. Certain embodiments are, in general, applicable to any other automatic tunneling mechanism in which it is highly preferable for tunneling, in other words, encapsulation/decapsulation, to be performed in the user terminal (UE). For example, certain embodiments may be implemented in connection with the so-called Teredo mechanism (UDP tunneling) proposed by C. Huitema et al., and/or the 6over4 mechanism proposed by B. Carpenter et al. (see also RFC 2529).

As described above, a data transmission from a first node, such as a user equipment UE, to a second node, such as an application server or IMS, via a communication network using different types of communication protocols, such as a 3GPP communication network using IPv6 and IPv4, is typically controlled by means of a transition mechanism, such as ISATAP. The transition mechanism is generally located in the communication network, for example, in a gateway node like a GGSN, which normally acts as a transition mechanism proxy. A data transmission from the first node is often forwarded, and/or tunneled, by the network node to the second node, wherein the transition mechanism functionality is typically performed in the network node, usually transparently for the first node.

It should be understood that the above description and accompanying figures are merely intended to illustrate the present invention by way of example only. The described embodiments of the present invention may thus vary within the scope of the attached claims.

I claim:

1. A method, comprising:

activating, by using a packet based data transmission protocol context, a communication connection based on a communication protocol of a first type from a user equipment to a network support node of a communication network;

allocating, by the network support node, a first connection information part comprising a first address related to the communication protocol of the first type to the communication connection of the user equipment;

allocating, by the network support node, and based on a transition mechanism used by the communication network, a second connection information part comprising a second address related to the communication protocol of a second type to the communication connection of the user equipment;

storing, by the network support node, the first connection information part and the second connection information part in a register, wherein the second connection information part is associated with the first connection information part in a common entry in the register;

tunneling, with the network service node being a tunnel end-point, the data transmission based on the communication protocol of the first type between the user equipment and the another node using a connection based on the communication protocol of the second type; and executing encapsulation/decapsulation for the data transmission based on the communication protocol of the second type by the network support node transparently for the user equipment, wherein the user equipment is connected to the communication network by the communication protocol of the first type, and wherein the communication network uses at least in part the communication protocol of the second type for forwarding the data transmission from the user equipment to the another node.

2. The method according to claim 1, wherein, in the activating of the communication connection, an activation request received from the user equipment at the network support node, the activation request comprising at least one of an indication for a dynamic addressing and an indication of an address type for the communication protocol of the first type.

3. The method according to claim 1, wherein, in the allocating of the first connection information part comprising a first address related to the communication protocol of the first type to the communication connection of the user equipment, the first address related to the communication protocol of the first type is allocated by the network support node.

4. The method according to claim 1, wherein, in the allocating of the first connection information part comprising a first address related to the communication protocol of the first type to the communication connection of the user equipment, the first address related to the communication protocol of the first type is requested from an external address allocation element contacted by the network support node.

5. The method according to claim 1, wherein, in the allocating of the second connection information part comprising a second address related to the communication protocol of the second type to the communication connection of the first node, the second address related to the communication protocol of the second type is allocated by the network support node from an internal pool of addresses.

6. The method according to claim 1, wherein, in the allocating of the second connection information part comprising a second address related to the communication protocol of the second type to the communication connection of the first node, the second address related to the communication protocol of the second type is requested from an external address allocation element contacted by the network support node.

7. The method according to claim 1, wherein, in the storing, the network support node stores the first connection information part and the second connection information part associated with each other by an entry in a table portion related to the communication connection of the user equipment, wherein the second connection information part is stored in a specific table field of the table portion.

8. The method according to claim 1, wherein, in the activating the communication protocol of the first type comprises one type of an internet protocol, in particular an Ipv6 based protocol, and the communication protocol of the second type comprises another type of an internet protocol, in particular an IPv4 based protocol.

9. The method according to claim 1, wherein, in the allocating, based on the transition mechanism, the transition mechanism used by the communication network comprises an automatic tunneling mechanism which uses, in particular, the intra-site automatic tunnel addressing protocol.

10. A system, comprising:
an activator configured to activate, by using a packet based data transmission protocol context, a communication connection based on a communication protocol of a first type between a user equipment and a network support node of a communication network;
a first allocator configured to allocate, in the network support node, a first connection information part comprising a first address related to the communication protocol of the first type to the communication connection of the user equipment;
a second allocator configured to allocate, in the network support node and on the basis of a transition mechanism used by the communication network, a second connection information part comprising a second address related to a communication protocol of a second type to the communication connection of the user equipment;
an associator configured to associate, by the network support node, the second connection information part with the first connection information part, and store, by the network support node, the associated first and second connection information parts in a register;
a tunneler configured to tunnel, with the network support node being a tunnel end-point, the data transmission based on the communication protocol of the first type between the user equipment and another node using a connection based on the communication protocol of the second type; and
an executor configured to execute encapsulation/decapsulation for the data transmission based on the communication protocol of the second type by the network support node transparently for the user equipment,
wherein the user equipment is connected to the communication network by the communication protocol of the first type, and
wherein the communication network uses at least in part the communication protocol of the second type for forwarding the data transmission from the user equipment to the another node.

11. An apparatus, comprising:
a network support node, the network support node comprising
an activator configured to activate, by using a packet based data transmission protocol context, a communication connection based on a communication protocol of a first type between a user equipment and the network support node;
a first allocator configured to allocate a first connection information part comprising a first address related to the communication protocol of the first type to the communication connection of the user equipment;
a second allocator configured to allocate, on the basis of a transition mechanism used by a communication network, a second connection information part comprising a second address related to a communication protocol of a second type to the communication connection of the user equipment;
an associator configured to associate the second connection information part with the first connection information part, and store the associated first and second connection information parts in a register;

a tunneler configured to tunnel, with the network support node being a tunnel end-point, the data transmission based on the communication protocol of the first type between the user equipment and another node using a connection based on the communication protocol of the second type; and an executor configured to execute encapsulation/decapsulation for the data transmission based on the communication protocol of the second type by the network support node transparently for the user equipment, wherein the user equipment is connected to the communication network by the communication protocol of the first type, and wherein the communication network uses at least in part the communication protocol of the second type for forwarding the data transmission from the user equipment to the another node.

12. The apparatus according to claim 11, wherein the activator of the network support node is configured to activate the communication connection and to receive an activation request from the user equipment, the activation request comprising at least one of an indication for a dynamic addressing and an indication of an address type for the communication protocol of the first type.

13. The apparatus according to claim 11, wherein the first allocator of the network support node is configured to allocate the first connection information part and to comprise first addresses related to the communication protocol of the first type and to allocate a selected one of the first addresses.

14. The apparatus according to claim 11, wherein the first allocator of the network support node is configured to allocate the first connection information part and to request an address for the first address related to the communication protocol of the first type from an external address allocation element.

15. The apparatus according to claim 11, wherein the second allocator of the network support node is configured to allocate the second connection information part and to comprise a pool of second addresses related to the communication protocol of the second type and to allocate a selected one of the second addresses.

16. The apparatus according to claim 11, wherein the second allocator of the network support node is configured to allocate the second connection information part and to request an address for the second address related to the communication protocol of the second type from an external address allocation element.

17. The apparatus according to claim 11, wherein the associator of the network support node is configured to store the associated first and second connection information parts in a register of the network element by updating an entry in a table portion related to the communication connection of the user equipment, wherein the second connection information part is stored in a specific table field of the table portion.

18. The apparatus according to claim 11, wherein the communication protocol of the first type comprises one type of an internet protocol, in particular an Ipv6 based protocol, and the communication protocol of the second type comprises another type of an internet protocol, in particular an IPv4 based protocol.

19. The apparatus according to claim 11, wherein the transition mechanism used by the communication network comprises an automatic tunneling mechanism which uses in particular the intra-site automatic tunnel addressing protocol.

20. An apparatus, comprising:

activating means for activating by using a packet data protocol context a communication connection based on a communication protocol of a first type between a user equipment and the apparatus;

first allocating means for allocating a first connection information part comprising a first address related to the communication protocol of the first type to the communication connection of the user equipment;

second allocating means for allocating, on the basis of a transition mechanism used by the communication network, a second connection information part comprising a second address related to a communication protocol of a second type to the communication connection of the user equipment;

associating means for associating the second connection information part with the first connection information part, and storing the associated first and second connection information;

tunneling means for tunneling, with the apparatus being a tunnel end-point, the data transmission based on the communication protocol of the first type between the user equipment and another node using a connection based on the communication protocol of the second type; and executing means for executing encapsulation/decapsulation for the data transmission based on the communication protocol of the second type by the apparatus transparently for the user equipment, wherein the user equipment is connected to the communication network by the communication protocol of the first type, and wherein the communication network uses at least in part the communication protocol of the second type for forwarding the data transmission from the user equipment to the another node.

21. The method according to claim 1, wherein the packet based data transmission protocol context is a packet data protocol context.

22. The method according to claim 1, wherein the network support node is a gateway node of a communication network, in particular a gateway general packet radio service support node.

23. The apparatus according to claim 11, wherein the packet based data transmission protocol context is a packet data protocol context.

24. The apparatus according to claim 11, wherein the network support node is a gateway node of a communication network, in particular a gateway general packet radio service support node.

25. An apparatus, comprising:

a network support node, the network support node comprising activating means for activating, by using a packet based data transmission protocol context, a communication connection based on a communication protocol of a first type between a user equipment and the network support node;

first allocation means for allocating a first connection information part comprising a first address related to the communication protocol of the first type to the communication connection of the user equipment;

second allocation means for allocating, on the basis of a transition mechanism used by a communication network, a second connection information part comprising a second address related to a communication protocol of a second type to the communication connection of the user equipment;

associating means for associating the second connection information part with the first connection information part, and store the associated first and second connection information parts in a register;

tunneling means for tunneling, with the network support node being a tunnel end-point, the data transmission based on the communication protocol of the first type between the user equipment and another node using a connection based on the communication protocol of the second type; and executing means for executing encapsulation/decapsulation for the data transmission based on the communication protocol of the second type by the network support node transparently for the user equipment, wherein the user equipment is connected to the communication network by the communication protocol of the first type, and wherein the communication network uses at least in part the communication protocol of the second type for forwarding the data transmission from the user equipment to the another node.

26. An apparatus, comprising:

an activator configured to activate by using a packet data protocol context a communication connection based on a communication protocol of a first type between a user equipment and the apparatus;

a first allocator configured to allocate a first connection information part comprising a first address related to the communication protocol of the first type to the communication connection of the user equipment;

a second allocator configured to allocate, on the basis of a transition mechanism used by the communication network, a second connection information part comprising a second address related to a communication protocol of a second type to the communication connection of the user equipment;

an associator configured to associate the second connection information part with the first connection information part, and storing the associated first and second connection information;

a tunneler configured to tunnel, with the apparatus being a tunnel end-point, the data transmission based on the communication protocol of the first type between the user equipment and another node using a connection based on the communication protocol of the second type; and an executor configured to execute encapsulation/decapsulation for the data transmission based on the communication protocol of the second type by the apparatus transparently for the user equipment, wherein the user equipment is connected to the communication network by the communication protocol of the first type, and wherein the communication network uses at least in part the communication protocol of the second type for forwarding the data transmission from the user equipment to the another node.

27. A computer program embodied on a computer-readable medium, said program configured to control a computer to perform a method, the method comprising:

activating, by using a packet based data transmission protocol context, a communication connection based on a communication protocol of a first type from a user equipment to a network support node of a communication network;

allocating, by the network support node, a first connection information part comprising a first address related to the communication protocol of the first type to the communication connection of the user equipment;

allocating, by the network support node, and based on a transition mechanism used by the communication network, a second connection information part comprising a second related to the communication protocol of a second type to the communication connection of the user equipment;

storing, by the network support node, the first connection information part and the second connection information part in a register, wherein the second connection information part is associated with the first connection information part in a common entry in the register;

tunneling, with the network service node being a tunnel end-point, the data transmission based on the communication protocol of the first type between the user equipment and another node using a connection based on the communication protocol of the second type; and executing encapsulation/decapsulation for the data transmission based on the communication protocol of the second type by the network support node transparently for the user equipment, wherein the user equipment is connected to the communication network by the communication protocol of the first type, and wherein the communication network uses at least in part the communication protocol of the second type for forwarding the data transmission from the user equipment to the another node.

* * * * *